United States Patent [19]

Moumdjian

[11] Patent Number: 4,845,861

[45] Date of Patent: Jul. 11, 1989

[54] INSOLE AND METHOD OF AND APPARATUS FOR MAKING SAME

[76] Inventor: Armenak Moumdjian, Nor Marash Street, Bourj-Hammud, Beirut, Lebanon

[21] Appl. No.: 74,765

[22] Filed: Jul. 17, 1987

[30] Foreign Application Priority Data

May 29, 1987 [IT] Italy ............................. 20715 A/87

[51] Int. Cl.$^4$ ..................... A43B 13/20; A43B 13/40
[52] U.S. Cl. ............................... 36/29; 36/44; 128/594
[58] Field of Search ............. 36/29, 28, 3 B, 44, 36/3 R; 128/594, 588

[56] References Cited

U.S. PATENT DOCUMENTS 2,677,906  5/1954  Reed ................................ 128/594
4,670,995  6/1987  Huang ................................ 36/29

FOREIGN PATENT DOCUMENTS 1459032  10/1966  France ................................ 36/29
WO82/00571  3/1982  PCT Int'l Appl. .................... 36/29

Primary Examiner—James Kee Chi
Attorney, Agent, or Firm—Herbert Dubno

[57] ABSTRACT

A foot-support element such as an insole or a part of an insole is provided with a checkvalve through which it can be selectively inflated, the top and bottom walls of the insole being bridged by partitions which retain the shape upon pressurization. The insole is formed with upper and lower parts in upper and lower die members working together with an intermediate die member which, upon removal, allows the upper and lower die members to be brought together to fuse the parts of the insole together.

7 Claims, 6 Drawing Sheets

INSOLE AND METHOD OF AND APPARATUS FOR MAKING SAME

FIELD OF THE INVENTION

My present invention relates to a foot-support element receivable in a shoe and provided with an air chamber which can receive air under pressure to form a support of adjustable resilience for the foot. More particularly, the invention relates to an insole, to a method of making an insole and apparatus, e.g. a molding die, for carrying out this method.

BACKGROUND OF THE INVENTION

In athletic and leisure-time wear, soles made of natural rubber, closed cellular or foam structures and like cellular materials are widely used because their elasticity or resiliency imparts a springiness to the step of the user that is particularly desirable in such applications.

While efforts have been made in the past to include air cells in such soles, such efforts have proved to be unsatisfactory because, on the one hand, it is desirable to be able to adjust the pressure of air in the air cell to vary the resilience of elasticity for the particular purpose or use. Furthermore, stability of the insole has proved to be a problem where a cell was provided in the interior of the insole and, in general, insoles with high resilience have tended to be associated with shape instability.

OBJECTS OF THE INVENTION

It is, therefore, a principal object of the present invention to provide a foot-support element, especially an insole, adapted to be received in a shoe and free from the drawbacks outlined above.

More specifically, it is an object of my invention to provide an improved insole whose resiliency and elasticity or springiness can be adjusted for a particular purpose or for a particular user after fabrication.

Still another object of my invention is to provide an insole with adjustable but high elasticity and yet excellent shape-retentive properties.

It is a further object of the invention to provide an improved method of making such an insole.

It is also an object of this invention to provide an improved apparatus for carrying out the method, i.e. for making the improved insole.

SUMMARY OF THE INVENTION

These objects and others which will become more readily apparent hereinafter are attained, in accordance with the present invention, in an insole having at least one pneumatic chamber and serving as a foot-support element receivable in a shoe and comprises at least one element of elastomeric or similar material, this element having lateral walls and top and bottom walls forming the pneumatic chamber. The bottom and top walls are connected to one another by partitions defining shaped internal sectors which can be formed by double walls having a U-shape in cross section with flanks extending perpendicularly from a top wall of the insole.

The partitions can extend between the top and bottom walls and when the partitions and sidewalls are formed in one element part which is then joined to another element part having corresponding partition and sidewall portions, the sectors can be closed by the integral bottom wall of the element.

Alternatively, the flanks can be connected by an intermediate section formed unitarily with the flanks and secured to the bottom wall of the insole to form a unitary body therewith.

At least one checkvalve is mounted in the or each foot-support element constituting the insole, compressed air being fed into the interior space enclosed within the walls of the foot-support element and surrounding each portion and sector through the respective checkvalve.

Transverse walls can be provided which connect the sidewalls of the internal sectors. The latter may open at the top or bottom wall or both.

The insole can constitute a single element extending over the entire length of the shoe and having the internal shape of the shoe. Alternatively, it can be made of two closed elements which are contiguous with one another but separate and disposed at heel and front portions of the shoe, respectively, each element having a respective checkvalve through which its chamber can receive air under pressure independently of the other so as to adjust the resilience, if desired, for the heel portion of the foot and the support of the ball of the foot, respectively.

According to an aspect of the invention, the foot-support element is formed by a die which comprises three main parts including a first outer die member, an intermediate die member and a second outer die member.

Although the particular orientation of the die member is not important to the invention, it is advantageous to provide the die members so that they lie generally horizontally in a superposed relationship and hence, I may refer herein also to upper, intermediate and lower die member, with the understanding that these terms are used only to facilitate description and not necessarily to indicate a critical orientation of the die members.

According to the invention at least one of the outer die member is formed with cavities which cooperate with projections of the intermediate die member to define the mold for one part of the foot-support element, including at least a portion of the sidewall, at least one support wall (either the top or the bottom) and at least one part of a partition or of each of a plurality of partitions.

The intermediate member and the outer member define a mold cavity for a second part of the element.

When the two parts of the element are simultaneously molded and the intermediate die member is separated, moved out of the way and the other die members are closed on one another while the molded first and second parts of the element are fusible together to thereby join the parts in a unitary structure.

While the element can be molded from a vulcanizable or by linkable material and the parts joined together before vulcanization, by linking or reticulation is complete, it is also possible to shape the parts from a thermoplastic or the like and to provide that the parts are joined together before they individually set.

The first and second parts respectively, formed in the first and second outer die members can have respective side-wall portions and partition portions, which are joined together substantially in a median plane of the element between the top and bottom walls. In that case, the members can be provided with formations for shaping in the sidewall, for example, a socket or seat for a checkvalve as previously described.

Alternatively, the partitions and sidewalls can be completely formed in one of the two outer parts while a bottom wall is formed between the other outer part and the intermediate part and is joined to the first part in the manner described.

More specifically, the die for the production of an insole with a pneumatic chamber according to the invention can comprise a lower die member, an intermediate die member and an upper die member. The lower die members and the intermediate die members have complimentary features which cooperate in defining a cavity for the upper wall, the sidewalls and the internal sectors, the respective part of the element being thus shaped in an overturned position.

The intermediate and upper die members have confronting formations defining a cavity for the bottom wall or sheet of the insole which can be joined to the first part when the intermediate die member is removable from between the upper and lower die members and the latter are brought together.

For injection molding, the intermediate die member is provided with channels for distribution of the injectable synthetic resin or plastic elastomer into the respective cavities.

At least the intermediate die member has internal passages through which a thermal-control fluid is circulated, this fluid serving to maintain at least the portions of the two parts which are to be joined together in a nonreticulated or nonset state before they are brought into contact with one another.

Furthermore, for injection molding, the lower die member can have passages with respective checkvalves facilitating the feeding of air to the chamber which is defined between the parts as the parts are brought together in the last stages of the molding process. This allows the injected air to support the walls and partitions after the intermediate member has been shifted from between the upper and lower members.

The injector for the plastic material can be located above the upper die member and can communicate with a passage traversing the upper die member and leading to the distribution passages in the intermediate die member. The distribution passages or channels are provided in such number and cross section to facilitate proper distribution of the material of appropriate portions to the various parts of the mold cavities between the upper die member and the intermediate die member and between the lower die member and intermediate die member simultaneously.

The surfaces of the die members defining the mold cavities are advantageously carried by adhesion-limiting coatings such as chromium plating or Teflon coating, which facilitates the disengagement of the material from the die members.

According to an aspect of the invention, a method of producing foot-support elements comprises simultaneously shaping the two parts of the element in the manner described each between an outer die member and the intermediate die member, then removing the intermediate die member and bringing the outer die members together with the respective first and second parts retained therein after removal of the intermediate die member. This permits fusion of the two parts and the portions which are brought into contact with one another to complete reticulation or cross-linking.

By controlling the temperature of the intermediate die member, I am able to prevent at least the facing surfaces of the two parts of the element from achieving complete reticulation and cross-linking before they are brought into contact with one another.

According to the method, moreover, during the joining of the two parts, the interior of the elements thus formed is placed under pneumatic pressure to support the walls during the final stage of the molding which can involve a compression molding or an injection molding.

BRIEF DESCRIPTION OF THE DRAWING

The above objects, features and advantages of my invention will become more readily apparent from the following description, reference being made to the accompanying highly diagrammatic drawing in which.

SPECIFIC DESCRIPTION

Figure 1:
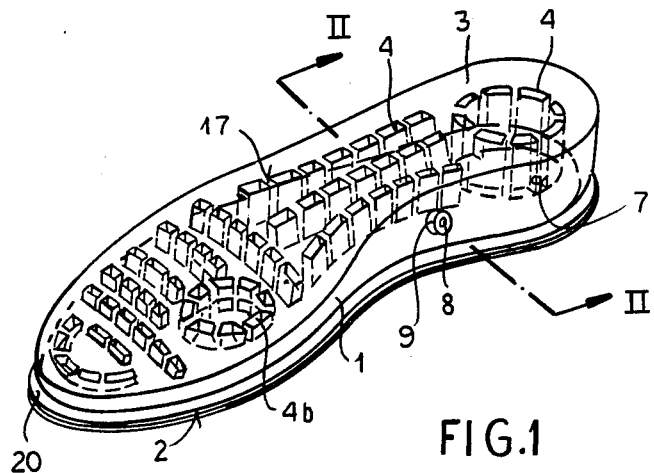
FIG. 1 is a perspective view of an insole in accordance with the invention.

The foot-support element shown in FIG. 1 is an insole which is composed of an elastomeric material, e.g. compression moldable or injection moldable rubber, with suitable characteristics of elasticity and washability externally shaped in accordance with the desired configuration of the insole and generally, therefore, having the shape of a foot or shoe interior.

The insole has sidewalls 1 extending around the perimeter of the insole, a bottom wall 2 and a top wall 3.

These walls enclose a chamber which also surrounds sectors 4 which subdivide the interior of the insole and open at the top wall 3 and shaped to the desired anatomical and deformity requirements, the sectors 4 constituting partitions which connect the bottom and top walls for this annular shape retentivity even when air under pressure is introduced into the insole.

Figure 2:
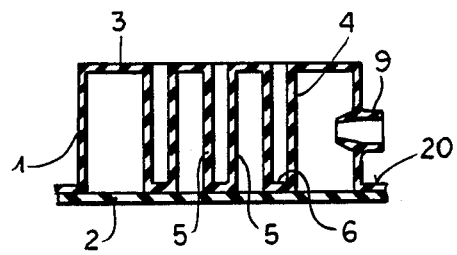
FIG. 2 is a cross-sectional view generally along the line II—II of FIG. 1.
Figure 3:
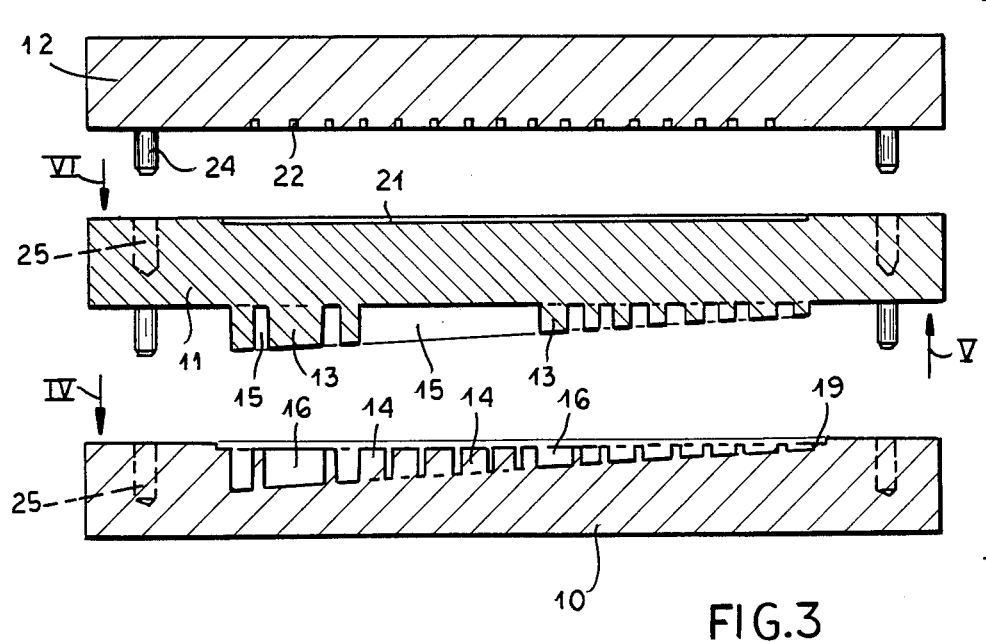
FIG. 3 is a vertical section through a mold assembly or die for making the insole, e.g. by compressing the section of FIG. 3 corresponding to a cross section along the line III—III of FIG. 4, the mold being shown in its operation position.
Figure 4:
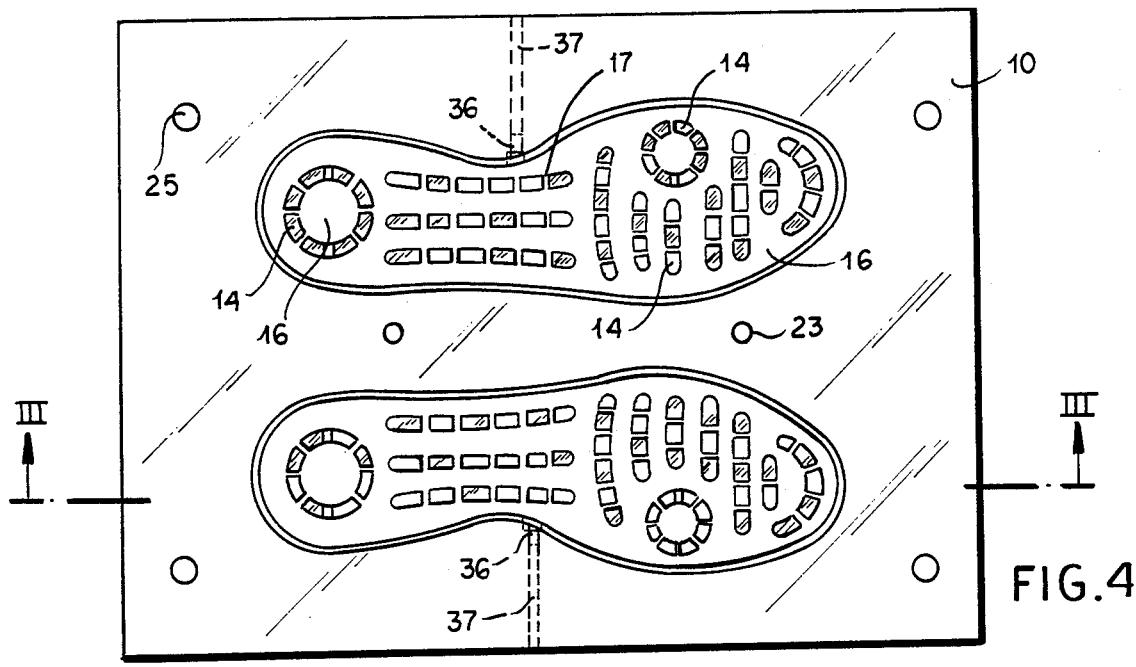
FIG. 4 is a plan view in the direction of arrow IV of the lower die member.
Figure 5:
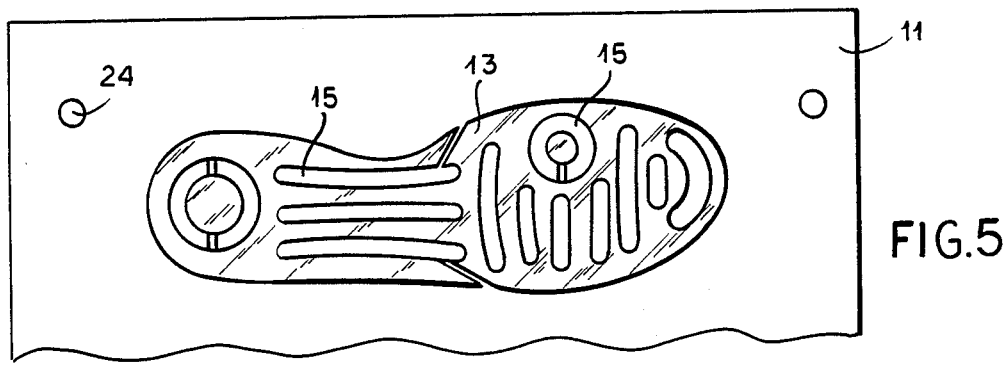
FIG. 5 is a bottom-plan view of the intermediate die member as seen in the direction of the arrow V of FIG. 3.

In the embodiment of FIG. 2, the dividing sectors or partitions 4 have a U-shaped cross-section, open upwardly, and defined by flanks 5 which extend from the top wall downwardly and are bridged by sections 6 which are secured to the bottom wall by fusion and cross-linking in the manner described.

Figure 16:
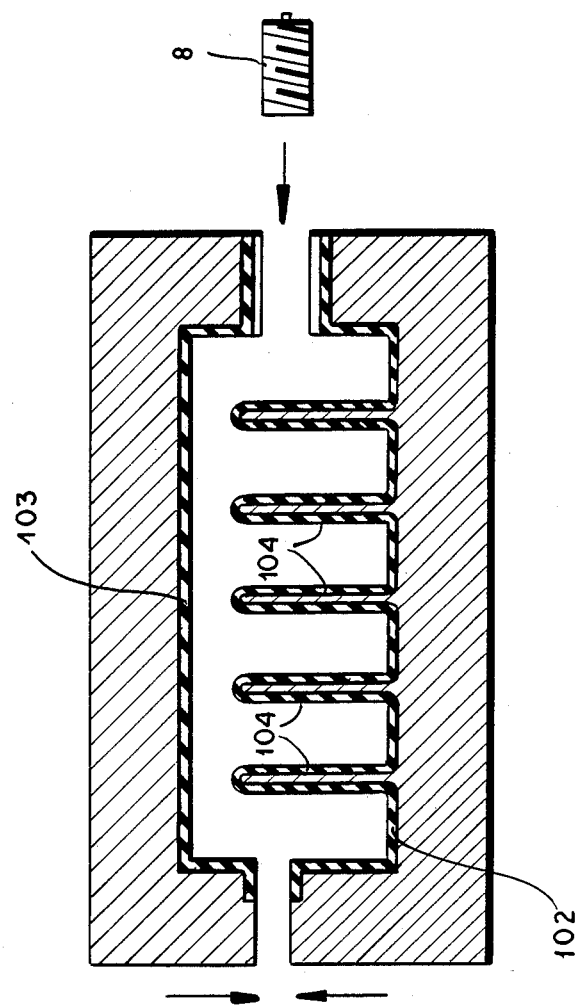
FIG. 16 is a cross-sectional view diagrammatically illustrating the operation before the insertion of a checkvalve into a foot-support element according to the invention.

In the embodiment of FIG. 16, the walls 104 defining the sectors are formed in two parts, each portion being unitary with the bottom wall 102 and the top wall 103 so that the sections 6 can be eliminated.

The sectors 4, 104 confer a certain degree of rigidity to the insole and maintain the top and bottom walls parallel to their original orientations even when the interior of the insole is pressurized.

When the dividing sectors have in certain areas a closed annular configuration as has been shown at 4a and 4b in FIG. 1, communication passages are provided to allow pressure to be supplied to the enclosed spaces of such sectors. A checkvalve 8 is located in a seat 9 formed by molding in the sidewall of the insole to allow the feeding of compressed air to the internal space thereof and to retain the air pressure during use or under the force represented by the weight of the user and any force applied kinematically.

The insole of the invention can be brought to an internal pressure which permits the performance of the insole in terms of cushioning shock, resilience, hardness or softness to be maximized either from the point of view of comfort or from the point of view of efficiency in sporting or athletic events, utilizing a manual pump which can be connected to the valve 8 and can be carried by the wearer.

The insole of the invention can be fabricated using the die shown in FIGS. 3–6. The die preferably comprises a first outer or lower die member 10, an intermediate die member 11 and an upper or second outer die member 12.

The elements 10 and 11 are formed respectively with outer fitting bosses and cavities 13, 14 and 15, 16, a mold cavity of the shape of a portion of the insole comprising the wall 3, the sidewalls 1 and the internal sectors or partitions 4.

The bosses 14 of the lower die member can be provided with transverse notches 17 of reduced thickness which form transverse walls between the sectors. These transverse walls bridge the flanks 5 of the same sector to confer dimensional stability to the insole. The recess formed in the die member 10 has a region 19 which is capable of forming a planar lateral lip aligning the peripheral margin of the sidewalls 1 (see FIGS. 1 and 2).

Figure 6:
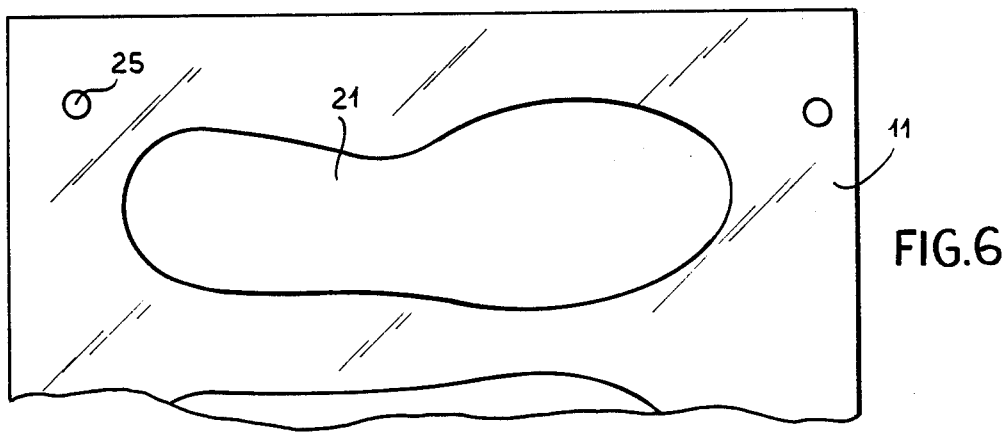
FIG. 6 is a top-plan view of the intermediate die member as seen in the direction of the arrow VI in FIG. 3.

The upper surface of the intermediate member 11 is formed with a recess 21 whose outline is best seen in FIG. 6 and corresponds to the external outline of the lateral lip 20 formed by the lower die member 10. In the region of this recess 21, the upper element 12 of the die has a plurality of holes 22 of small diameter and limited depth which can be of the same particular design or can merely conform to the shape of the sole the lower die element or member 10 can also be provided with recesses 23 for the formation during the stamping or molding process of the seat 9 for the valve 8.

In the usual manner, the die members 10–12 can be provided with locating pins 24 and holes 25 for mutual centering and alignment as the mold members are brought together.

Figure 7:
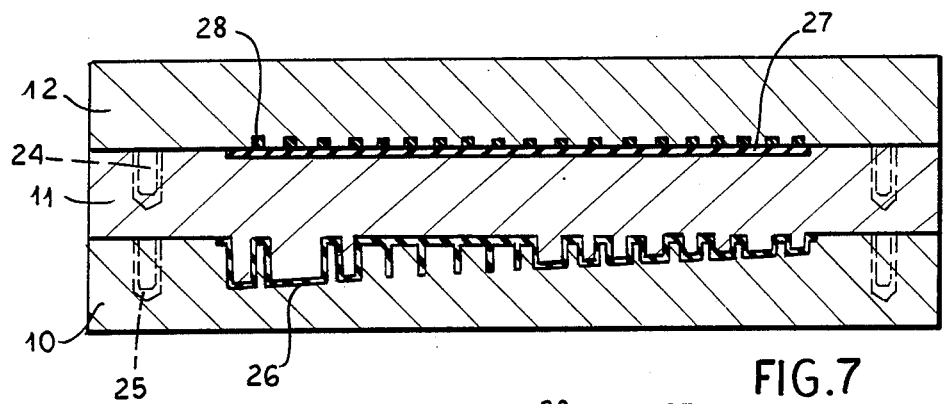
FIG. 7 is a cross-sectional view similar to FIG. 3 with the die closed showing the first molding stage according to the invention.

As has been shown in FIG. 7, the initial molding stage comprises the simultaneous formation of the lower portion 26 of the insole and the upper portion 27.

Figure 8:
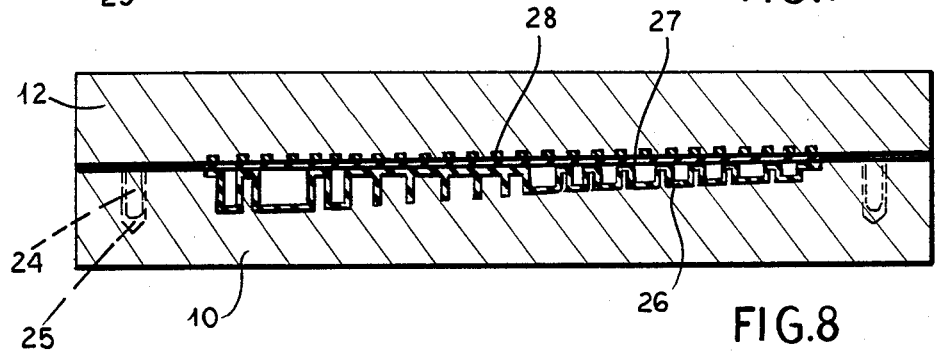
FIG. 8 is a corresponding cross-sectional view after the intermediate die member has been removed showing the final molding stage.
Figure 12:
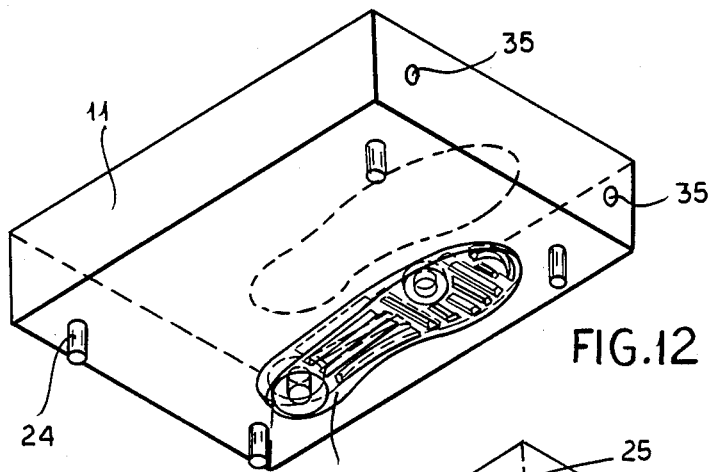
FIG. 12 is a bottom-perspective view diagrammatically showing the intermediate die member.

While the molded material is still in an intermediate state of reticulation, cross-linking or vulcanization, the die is opened and the intermediate die member 11 is removed, whereupon the two outer die members 10 and 12 are closed together (FIG. 8).

The lower portion of the insole which was lodged in the lower die member 10 thus meets the upper portion 27 of the insole which remained affixed in the upper die member 12 because of a slight penetration of the molded material into the holes 22 to form the bosses 28.

The lip 20 and the upper portions 6 of the internal sectors 4 make contact with the bottom surface of the upper portion 2 of the insole to cause these contacting parts to adhere and to form a single body when vulcanization is completed, i.e. the complete vulcanization time has elapsed.

A suitable composition of a vulcanizable material for this purpose comprises in parts by weight: POLISAR BUTYL 301 700 parts by weight, $ZnO_2$ 35 parts by weight, STEARIC ACID 7 parts by weight, ANOX HB 3.5 parts by weight, PARAFFIN OIL SIMPAR 140 parts by weight, NERO PHILBLACK GPFN 660 350 parts by weight, VULKACIT THIURAM TMTD 10.5 parts by weight, VULKACIT DM MBTS 7 parts by weight, ZOLFO 12.6 parts by weight.

This product can be vulcanized at 170° C. The preferred vulcanization temperature generally lies between 150° and 200° C.

During the final vulcanization stage, compressed air is fed to the interior of the insole through one or both of the die members 10 and 12 to assure that even in the absence of the intermediate element 11, the mold-defined shape is maintained and the pressure is sufficient to effect the vulcanization.

The insole is then removed from the die and a valve 8 inserted in the seat and the bosses 8 can be cut off, if not desired, and the lip 20 can be cut back.

The portion 27 of the insole which was formed in the upper part of the die constitutes the bottom wall 2 of the insole while the bottom of the portion 26 forms the top wall (see FIG. 1) or vice versa.

The die can be provided with passages or conduits for a thermal control fluid and any necessary elements for temperature control and control of the vulcanization process in a manner not further illustrated or described.

Figure 9:
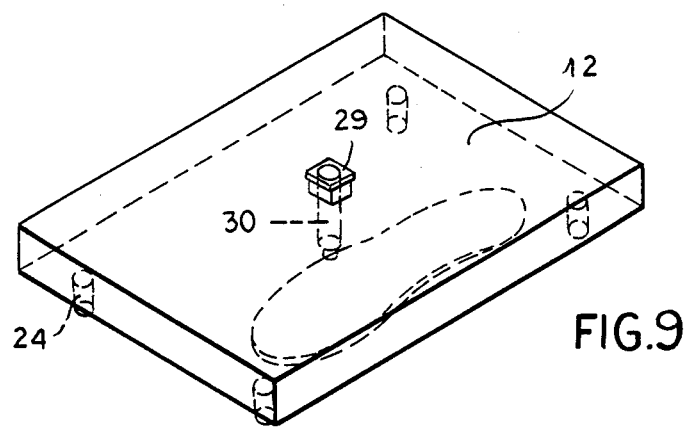
FIG. 9 is a perspective view of the upper member of a die for injection molding of an insole according to the invention.
Figure 10:
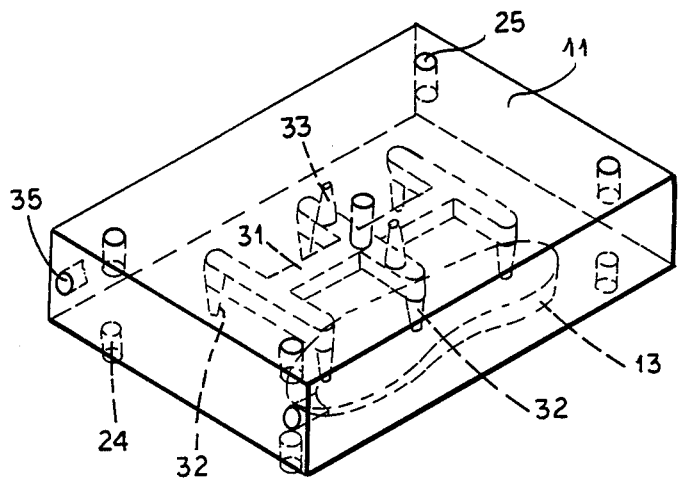
FIG. 10 is a diagrammatic-perspective view of the intermediate die member illustrating the distribution channels used for injection molding.
Figure 11:
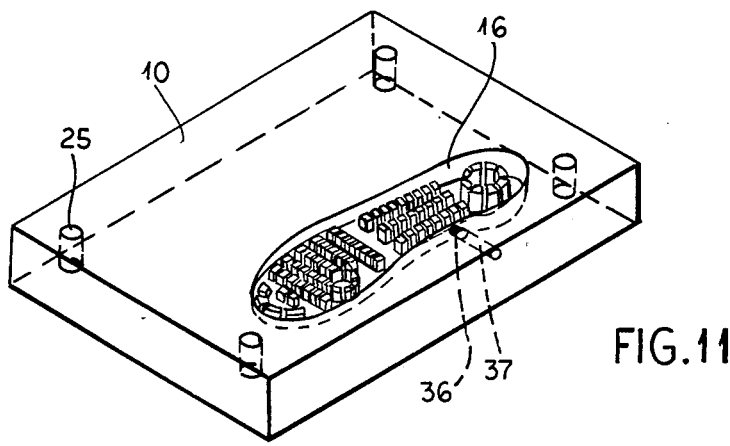
FIG. 11 is a top-perspective view diagrammatically showing the lower die member.
Figure 14:
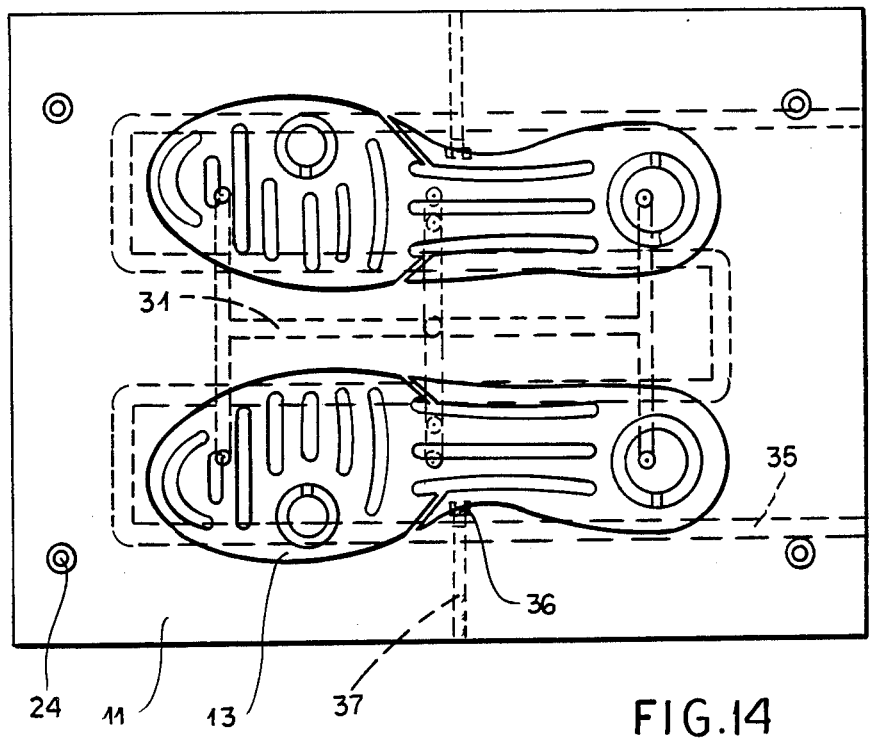
FIG. 14 is a plan view of the intermediate die member.

FIGS. 9–11 show the use of injection molding to fabricate the insole of the invention in a manner which is more economical than the molding technique described in connection with FIGS. 3–8.

In this case, the upper portion of the die member is provided with a location 29 at which the injection molding machine nozzle can be applied, preferably in an intermediate position between two molding cavities only one of which has been illustrated in these FIGURES.

From the region 9, a passage 30 in the upper die element 12 communicates with a branched passage or manifold 31 in the intermediate die member 11 which communicates the injected material to the recess of the lower die member 10 and to the recess between the upper and intermediate die members.

Depending upon the volumetric distribution between upper and lower parts of the insole, appropriate numbers of branches are provided, for example, three branches for the lower part of the insole in the embodiment illustrated in FIGS. 9–11 and one branch 33 for the upper part.

Of course, when the upper and lower parts (see FIG. 16) have approximately the same volumes of material, the number of downwardly opening branches 32 can equal the number of upwardly opening branches 33.

Figure 13:
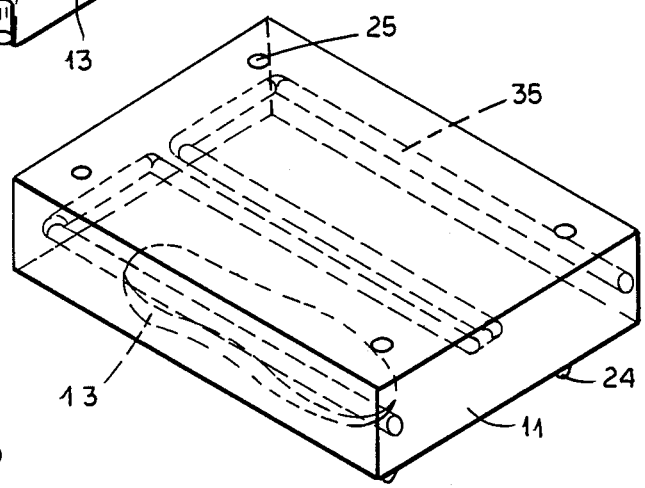
FIG. 13 is a perspective diagram showing the passages or conduits of the intermediate die member which served to conduct the thermal control fluid.

A coil 35, schematically illustrated in FIG. 13 is advantageously provided in the element 11 for the circulation of a thermostatic fluid in a circular path provided with appropriate valves and temperature control means. Similar coils can be provided in the upper and lower die members as required.

For both the compression molding and injection molding, checkvalves 36 can be provided to communicate through the seats 9 being provided with passages 37 through which compressed air is delivered to the insole during the molding process.

The injection molding also forms lower and upper portions of the insole simultaneously and, although the material transforms sufficiently to be able to hold its shape without having completely congealed, the upper and lower die members are brought together after the intermediate die member has been removed to permit fusion of the two parts of the insole and completion of any reticulation or cross-linking as described.

As has previously been described, in order to preserve the desired shape of the insole, compressed air is fed through the passage 17 and checkvalve 16 to hold the injection molding material to the recesses of the die.

During the formation of the upper and lower members of the insole, it is advantageous to maintain the upper die member at a temperature lower than the temperature of the lower die member by control of the fluids which are circulated through these mold members to prevent the lower portion of the insole which is formed from completing reticulation in a shorter time than the upper portion because of a reduced thickness.

Material is prevented from hardening within the passages 30–33 by the fluid guided through the coil 35 which maintains the intermediate die member at a temperature which is such that reticulation of the material in the passages cannot be completed.

During the fusion stage, when the lower part is joined to the upper part of the insole the temperature can be raised to accelerate completion of cross-linking.

Figure 15:
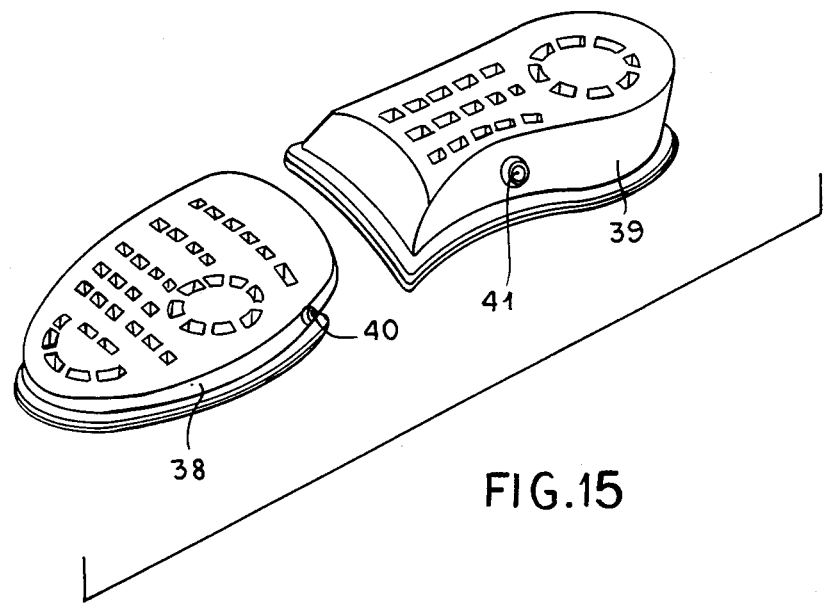
FIG. 15 is a perspective view of a two-part insole.

While I have described the formation of a unitary insole heretofore, it should be noted that for athletic shows, for example, it may be advantageous to make the insole from two portions as represented in FIG. 15, one corresponding to a frontal part of the foot between the ball of the foot while the other corresponds to a heel portion. These parts may be bonded to the sole of the shoe and to an upper.

In this case, each of the separate parts 38 and 39 can be provided with a separate checkvalve 40 or 41 by which the pressure can be controlled independently of the other part. A high pressure can be provided in one region which is suitable for the energy of the athletic action without stiffening the entire insole or reducing flexibility of the other part.

I claim:

1. A foot support for a shoe, comprising an element adapted to be received in a shoe and composed of an elastically deformable material with a bottom wall, a top wall and a sidewall extending generally around a perimeter of said element and connecting said top and bottom walls together, said element being formed with a multiplicity of hollow projections extending from one of said top and bottom walls to the other of said top and bottom walls, molded unitarily with said one of said walls, closed at ends remote from said one of said top and bottom walls, and bonded by molding onto said other of said top and bottom walls, said other wall having a generally flat surface located across a full thickness for the foot support from said one wall and at which said closed ends of said projections are bonded to said other wall whereby said projections each extends said full thickness between the top and bottom walls, said hollow projections opening at a surface of said one of said walls turned away from said other of said walls, said walls defining within said element and around said projections at least one chamber, one of said walls being formed with a checkvalve enabling introduction of air under pressure into said chamber to support said top wall against a load applied by a foot with a variable resilience determined by air pressure in said chamber.

2. The foot support defined in claim 1 wherein said element has at least part of the shape of an insole.

3. The foot support defined in claim 2 wherein said projections are partitions and said partitions are spaced apart in said element, said chamber surrounding said partitions.

4. The foot support defined in claim 3 wherein each of said partitions is of a U-shaped cross section having shanks rising from said bottom wall toward said top wall and interconnected by an intermediate part of the partition formed unitarily with the respective shanks.

5. The foot support defined in claim 3 wherein said partitions have the shape of sectors, further comprising transverse webs interconnecting opposite flanks of each sector and unitary with the partitions forming each sector.

6. The foot support defined in claim 3 wherein said element is a complete insole extending continuously from a sole end to a heel end thereof.

7. The foot support defined in claim 3 wherein said element is one of two such elements each forming part of an insole and separately insertable into said shoe and having a respective checkvalve for introduction of air under pressure into the respective element independently of the introduction of air under pressure into the other element.

* * * * *